US012151264B2

(12) United States Patent
Staun et al.

(10) Patent No.: US 12,151,264 B2
(45) Date of Patent: Nov. 26, 2024

(54) MOBILE SORTING UNIT

(71) Applicant: BEUMER GROUP A/S, Aarhus (DK)

(72) Inventors: Jorgen Staun, Hinnerup (DK); Mads Dahlerup Piculell, Aarhus (DK); Henrik Frank Skyum, Hadsten (DK)

(73) Assignee: BEUMER GROUP A/S, Aarhus (DK)

( * ) Notice: Subject to any disclaimer, the term of this patent is extended or adjusted under 35 U.S.C. 154(b) by 0 days.

(21) Appl. No.: 18/033,632

(22) PCT Filed: Sep. 6, 2021

(86) PCT No.: PCT/EP2021/074474
§ 371 (c)(1),
(2) Date: Apr. 25, 2023

(87) PCT Pub. No.: WO2022/106086
PCT Pub. Date: May 27, 2022

(65) Prior Publication Data
US 2023/0398574 A1    Dec. 14, 2023

(30) Foreign Application Priority Data
Nov. 17, 2020  (EP) .................................. 20208208

(51) Int. Cl.
*B07C 3/08* (2006.01)
*B65G 29/02* (2006.01)
(52) U.S. Cl.
CPC ............... *B07C 3/08* (2013.01); *B65G 29/02* (2013.01)

(58) Field of Classification Search
CPC ...... B07C 3/08; B65G 29/02; B65G 47/1442; B65G 47/40; B65G 1/1373; B65G 1/1375; B66F 9/063; B66F 9/12; B66F 9/122; B66F 9/127
See application file for complete search history.

(56) References Cited

U.S. PATENT DOCUMENTS 5,246,332 A * 9/1993 Bernard, II .......... B65G 1/0485
414/807
5,441,141 A * 8/1995 Bonnet ..................... B07C 3/08
198/786

(Continued)

FOREIGN PATENT DOCUMENTS

CN  110654788 A  1/2020

OTHER PUBLICATIONS

International Search Report and Written Opinion of the ISA issued in PCT/EP2021/074474, mailed Nov. 23, 2021; ISA/EP.

*Primary Examiner* — Joseph C Rodriguez
(74) *Attorney, Agent, or Firm* — Harness, Dickey & Pierce, P.L.C.

(57) ABSTRACT

A mobile, in particular autonomous, sorting unit, for transporting cargo to be transported in a logistics area, a production area or the like, having a cargo receiving unit which has a plurality of cargo carriers for receiving a plurality of cargo items, the cargo receiving unit being configured for autonomous discharging of the cargo items in any desired order by moving the cargo carriers to be unloaded to a discharging position. The invention further relates to a respective method for delivering cargo items to at least two different stations in a logistics area, a production area or the like with an autonomous mobile sorting unit.

17 Claims, 8 Drawing Sheets

(56) References Cited

U.S. PATENT DOCUMENTS

Figure 1:
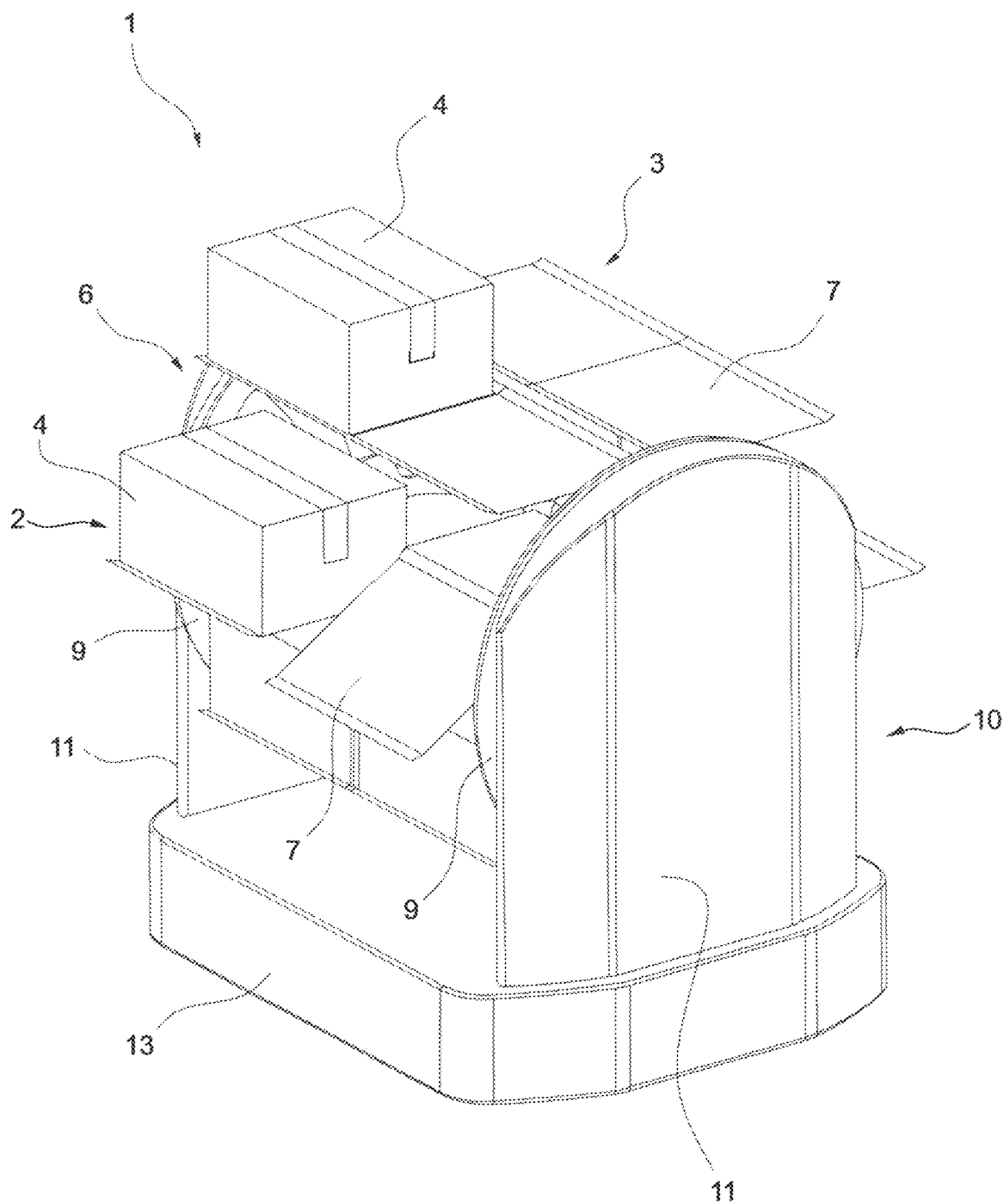

| | | | | |
|---|---|---|---|---|
| 5,672,039 | A * | 9/1997 | Perry | B65G 47/962 |
| | | | | 414/280 |
| 6,279,750 | B1 * | 8/2001 | Lohmann | B07C 3/02 |
| | | | | 209/552 |
| 8,335,585 | B2 * | 12/2012 | Hansl | B65G 1/1378 |
| | | | | 700/214 |
| 8,571,701 | B2 * | 10/2013 | Lunak | G06Q 10/087 |
| | | | | 700/216 |
| 10,048,697 | B1 | 8/2018 | Theobald | |
| 10,437,255 | B1 | 10/2019 | Theobald | |
| 2004/0079620 | A1 * | 4/2004 | Aleshire | A47B 49/00 |
| | | | | 312/249.8 |
| 2009/0272859 | A1 * | 11/2009 | Pippin | B62B 3/002 |
| | | | | 280/47.35 |
| 2010/0262279 | A1 * | 10/2010 | Jost | B65H 39/06 |
| | | | | 700/220 |
| 2017/0088355 | A1 * | 3/2017 | Khodl | B65G 1/1375 |
| 2018/0186572 | A1 * | 7/2018 | Issing | B65G 1/1375 |
| 2020/0019144 | A1 * | 1/2020 | Wise | G06Q 10/087 |
| 2023/0102469 | A1 * | 3/2023 | Kim | B07C 3/005 |
| | | | | 209/552 |
| 2023/0114850 | A1 * | 4/2023 | Kolay | B07C 3/008 |
| | | | | 209/707 |
| 2023/0264900 | A1 * | 8/2023 | Raikar | B65G 47/647 |
| | | | | 198/586 |

* cited by examiner

MOBILE SORTING UNIT

CROSS-REFERENCE TO RELATED APPLICATIONS

This application is a U.S. National Phase Application under 35 U.S.C. 371 of International Application No. PCT/EP2021/074474, filed on Sep. 6, 2021, which claims the benefit of European Patent Application No. 20208208.7, filed on Nov. 17, 2020. The entire disclosures of the above applications are incorporated herein by reference.

BACKGROUND

This section provides background information related to the present disclosure which is not necessarily prior art.

TECHNICAL FIELD

The invention relates to a mobile, in particular autonomous, sorting unit, for transporting cargo to be transported in a logistics area, a production area or the like, having a cargo receiving unit which has a plurality of cargo carriers for receiving a plurality of cargo items, the cargo receiving unit being configured for autonomous discharging of the cargo items in any desired order by moving the cargo carriers to be unloaded to a discharging position. The invention further relates to a respective method for delivering cargo items to at least two different stations in a logistics area, a production area or the like with an autonomous mobile sorting unit.

Discussion

A mobile robot is known from U.S. Pat. No. 10,437,255 B1. The mobile robot comprises a mobile robot base, a conveyor belt and a drive system. The conveyor belt is configured to receive an item with the mobile robot and to provide the item from the mobile robot. The conveyor system supports the item during movement of the mobile robot within its operating environment. However, the disclosed robot has the disadvantage that when the robot is loaded with a plurality of items, these cannot be unloaded in any order, but only according to their arrangement on the conveyor belt.

SUMMARY

This section provides a general summary of the disclosure, and is not a comprehensive disclosure of its full scope or all of its features.

Therefore, it is one technical aspect of the present invention to provide a mobile robot which has a high degree of flexibility and efficiency.

The mobile, in particular autonomous, sorting unit, for transporting cargo to be transported in a logistics area, a production area or the like, according to the invention can have a cargo receiving unit which has a plurality of cargo carriers for receiving a plurality of cargo items. Further, the cargo receiving unit can be configured for autonomous discharging of the cargo items in any desired order by moving the cargo carriers to be unloaded to a discharging position.

It is an essential advantage of the mobile sorting unit that a number of parcels can be transported to different destinations in an unsorted order and when a particular destination is reached the cargo receiving unit moves all of the parcels assigned to this particular destination in a discharging position from which the parcels can be discharged from the mobile sorting unit. This makes it possible to carry multiple items while being able to sort them even at a late stage such that the cargo can be sorted at any time before reaching a certain unloading destination. It is also possible to reload packages as soon as loading spaces respectively cargo carriers have become free due to intermediate unloading. Another essential advantage of the present invention therefore is the possibility to optimize distances of delivery routes within the working area of the mobile sorting unit by not having to follow a certain sequence when loading and unloading cargo items.

The mobile sorting unit can have several discharging positions. For example, the mobile sorting unit can have discharging positions on one side or two opposite sides. Accordingly, the cargo carriers can be moved to the sides of the mobile sorting unit. When unloading cargo items via the sides of the mobile sorting unit, the cargo carriers can be adjusted in such a way that the cargo slides sideways to a take-over point of a delivery station or falls sideways from the mobile sorting unit to a take-over point of the delivery station. Furthermore, the mobile sorting unit can have a discharging position at the lowest position a cargo carrier can take in the cargo receiving unit. In doing so, it is possible for the cargo to fall out of a cargo carrier at the bottom and especially to a point below the mobile sorting unit. Furthermore, it is conceivable that when unloading the cargo items to one or two sides of the mobile sorting unit, the cargo carriers can be arranged in several levels one above the other in the load receiving unit, so that unloading of the load from several levels can take place simultaneously and/or to different delivery stations. Furthermore it is possible to unload cargo items to the top of a piled up receiving stack and by this continuously adapting the discharging height to the level of stack size. The mobile sorter further is configured to measure the stack size when arriving at the stack or use a respective information of the last unloading operation. Thereby, it is possible that the mobile unit can detect the load level of the discharging stations when parsing the station, having the advantage that no separate detection is required at the discharging station. Information to empty the discharging station can then be send to the operator or the higher-level control system.

The mobile sorting unit can be loaded via several receiving positions. It is conceivable that cargo items are loaded on the cargo carriers which are currently located at the top position of the cargo receiving unit by placing the cargo items on top of them. Further, it is possible to load cargo items from the sides of the mobile sorting unit onto the respective cargo carriers. Therefore, the discharge positions at the sides of the mobile sorting unit can likewise be used as receiving positions. It is possible that the mobile sorting unit is being loaded from several receiving positions simultaneously.

It is possible that the mobile sorting unit is an automated guided vehicle (AGV), an autonomous mobile robot (AMR) or any similar autonomous mobile unit. Thereby, it is conceivable that the mobile sorting unit has a control unit by means of which a drive of the mobile sorting unit can be controlled so that the mobile sorting unit can be moved along a desired path through a designated working area. For example, the control unit may control the drive of the mobile sorting unit in such a way that the mobile sorting unit travels to a number of stations in the working area according to predefined criteria, such as a predetermined sequence or the shortest possible distance. The control unit can also be set up to control a drive of the cargo receiving unit in such a way that selectable cargo carriers of the cargo receiving unit can be moved into a receiving position and/or into an unloading position and the load carriers can be adjusted accordingly between a receiving position or transport position and an unloading position.

It is possible that the cargo receiving unit is configured to discharge the cargo items by gravitational force. Accordingly, it may be possible that the cargo carriers take up an angled position for unloading the cargo items, so that the load falls diagonally to the side or vertically downwards. For example, the cargo carriers can have a low-friction coating. Furthermore, the cargo carriers can have laterally fold-away holding elements, which enable the unloading of cargo items at a specific time. Alternatively or additionally, it is possible that the cargo carriers each comprise means for unloading cargo items on their own, and in particular in a horizontal unloading direction. For example, each carrier can have a conveyor that moves relative to the carrier and in particular is attached to the carrier, such as a conveyor belt or a crossbelt element.

It is possible that the cargo receiving unit is being configured for, in particular autonomously, receiving the cargo items by moving the cargo carriers to be loaded to a receiving position.

It can be possible that the distance between the cargo carriers is different to carry different sizes of cargo especially to adapt to cargo height.

It is further possible that the cargo receiving unit is configured to receive cargo items in an essentially horizontally directed movement. For example, the mobile sorting unit can be approached to a belt conveyor in such a way that the belt conveyor and the top of the cargo carrier to be loaded are arranged vertically at essentially the same height. Alternatively, it can be possible that the cargo is transferred from a conveyor belt that is located vertically above the cargo carrier of the mobile sorting unit. Alternatively, it is possible that the cargo carriers are parked next to sloping chutes from which the cargo items are delivered from a diagonally above direction. The mobile sorting unit can comprise stop elements oppositely of the loading sides of the cargo carriers to keep the cargo items on the carrier and to avoid the cargo items to slide beyond the carriers.

Further, it is possible that the cargo carriers are moved to the discharging position by a rotary conveyor, the rotary conveyor in particular having a vertical rotation plane. The rotary conveyor can be moved in both directions. The rotary conveyor can also be steplessly moveable. Alternatively, the rotary conveyor can have a number of positions corresponding to the number of cargo carriers, which the rotary conveyor can approach reproducibly and can be locked in these positions. In this way, the cargo carriers can, for example, be moved successively to certain discharging positions. With the aim of preventing cargo items from falling off the mobile sorting unit, the mobile sorting unit may have a mechanism and/or a control means by which the individual cargo carriers are balanced as a function of changing centrifugal forces acting on the cargo items.

Mobile sorting unit according to one of the preceding claims, wherein it is possible that each cargo carrier is configured to receive one cargo item. Optionally, it is provided that each cargo item is provided with a detectable identifier, such as a barcode or a QR-code, in order to be able to deliver each cargo item to the unloading station intended for it. Alternatively it can be provided that a group of cargo items can be loaded on the same cargo carrier as long as the same destination station is assigned to each element of the group. It is further possible that one cargo item is loaded on two, in particular neighboring, cargo carriers. In this case, the unloading mechanisms of the cargo carriers can be controlled in such a way that they both trigger the unloading process simultaneously when an unloading signal is received.

Further, it is possible that the cargo carriers are tiltable trays, the trays being tiltable between a loading and/or carrying state and a discharging state. The trays may have a flat surface. Alternatively, the trays can be bowl-shaped. The tilt plane of the trays can correspond in particular to the rotation plane of the rotary conveyor. Alternatively, it is conceivable that similar cargo carrying means, in particular such as pockets, are used instead of the trays.

Furthermore, it is conceivable that the trays are essentially horizontal in the loading and/or carrying state, and the trays being tilted out of the horizontal plane in their discharging state. It is intended that all trays are kept in a horizontal position as long as they are empty or are loaded and no unloading is planned. In particular, it may be provided that during movements of the rotary conveyor the surfaces of the trays may always face upwards. Only when a tray is intended for unloading and it is in a discharging position is it tilted for unloading or opened at its bottom. When tilting the trays for unloading, it can be provided that the tilting always takes place to an outside of the mobile sorting unit.

It is possible, that each tray is individually tiltable. It is possible that a plurality of, in particular two, trays are arranged side by side on the same shaft which is held by the rotary conveyor. Nevertheless, each of the trays can be tilted independently from each other. However, it can further be possible that multiple trays are tilted simultaneously.

Further, the tiltable trays can each be fixed in the rotary conveyor via a shaft arranged transverse to the conveying direction of the rotary conveyor, the trays being tiltable relative to the shaft, wherein at least one tray is mounted on each shaft.

Furthermore, the rotary conveyor can comprise two parallel rotary conveying means spaced apart from each other, between which the shafts are mounted. The parallel rotary conveying means can be disks which are rotatably mounted in the cargo receiving unit, whereby the shafts holding the cargo carriers can be arranged distributed over the circumference of the disks, the shafts being perpendicular to the disks. Alternatively, the rotary conveying means can be realized by belt conveyors, whereby the shafts are fixed to the belts opposite each other and the belts are guided over an upper and a lower deflection roller. Alternative rotary means can be provided, in which the aim is to rotate the cargo carriers to a specific target position.

It is possible that a plurality of shafts is mounted spaced apart from each other in essentially equal distances over the circumference of the rotary conveyor. It is further possible that two tiltable trays are mounted on each shaft.

Furthermore the rotary conveyor can be held by a mounting frame which is mounted on or suspended from the mobile sorting unit, wherein the mounting frame comprises at least two vertical struts between which the rotary conveyor can be held. It is possible that at least one, in particular horizontal, cross strut is mounted between the two vertical struts. Further, it can be possible that the cargo receiving unit can be separated from the base of the mobile sorting unit for storage purpose.

It is further possible that the rotary conveyor is driven by at least one drive shaft mounted in the mounting frame. If it is intended that the rotary conveyor is designed as a belt conveyor, both the upper and the lower deflection roller can be mounted in the mounting frame, whereby one of the rollers, especially the upper one, is driven.

The invention further concerns a method for delivering cargo items to at least two different stations in a logistics area, a production area or the like with an autonomous mobile sorting unit, comprising:

Loading a plurality of cargo carriers of the mobile sorting unit with a plurality of cargo items in a random or defined order, in particular from a horizontal loading direction;

Respectively moving cargo carriers to be unloaded to a discharging position on the mobile sorting unit in order to realize an optimized, in particular a shortest, delivery route of the mobile sorting unit in the logistics area, the production area or the like; and Approaching at least two different cargo item delivery stations with the mobile sorting unit for unloading cargo items assigned to the respective stations.

Alternatively to the possibility of loading from a horizontal loading direction, loading can also come from the top by drop means, in particular in essentially a vertical direction.

Loading of the cargo carriers can be performed via a receiving position on the top of the mobile sorting unit or receiving positions on the sides of the mobile sorting unit.

After loading, the mobile sorting unit can pass an identification device, which identifies the loaded cargo items and their position on the mobile sorting unit, especially their assignment to the cargo carrier on which they are loaded. Alternatively, the cargo already is identified when or before being loaded. For example, the scan and identification can happen during conveyor induction. Alternatively, the mobile sorting unit has an identification unit mounted. It is possible that identification is carried out by rotating the rotating conveyor.

The information concerning the identified cargo items can be transferred to the control unit of the mobile sorting unit. Furthermore, the control unit can receive information about the delivery locations of the cargo items from a higher-level cargo item management system. Based on these two pieces of information, the control unit can plan an optimal route for delivery of the load units. In addition, information about cargo items loaded at stations that have been approached in the meantime can be collected and processed so that the planned route can be continuously updated.

The delivery stations to be approached can be ground delivery stations or side delivery stations, which receive the cargo items via chutes or belt conveyors or the like arrangements.

Approaching the delivery stations can include intermediate loading or reloading of cargo items on empty cargo carriers.

It is possible that the unloading of the cargo items is realized by gravitational force.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
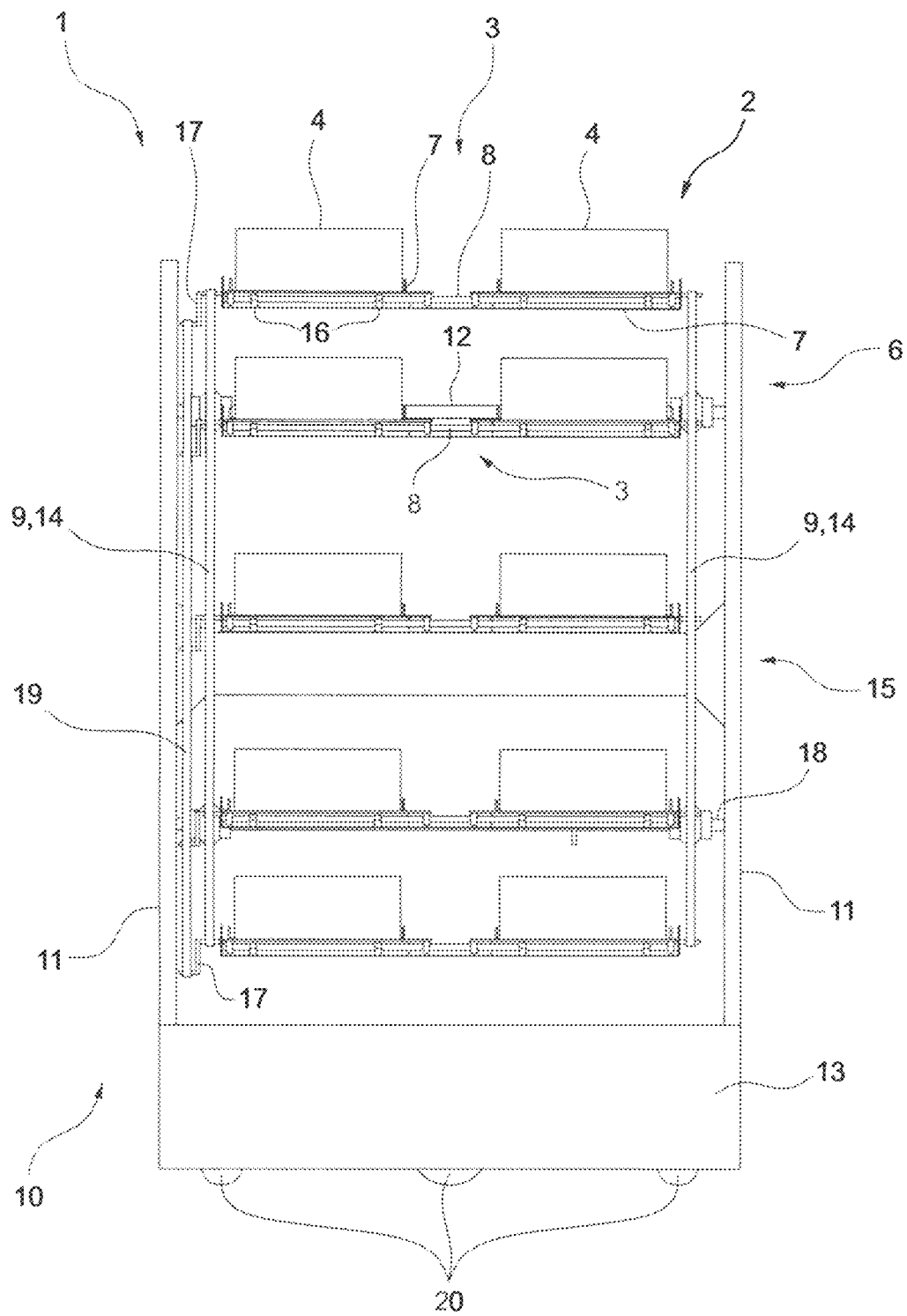
Figure 3:
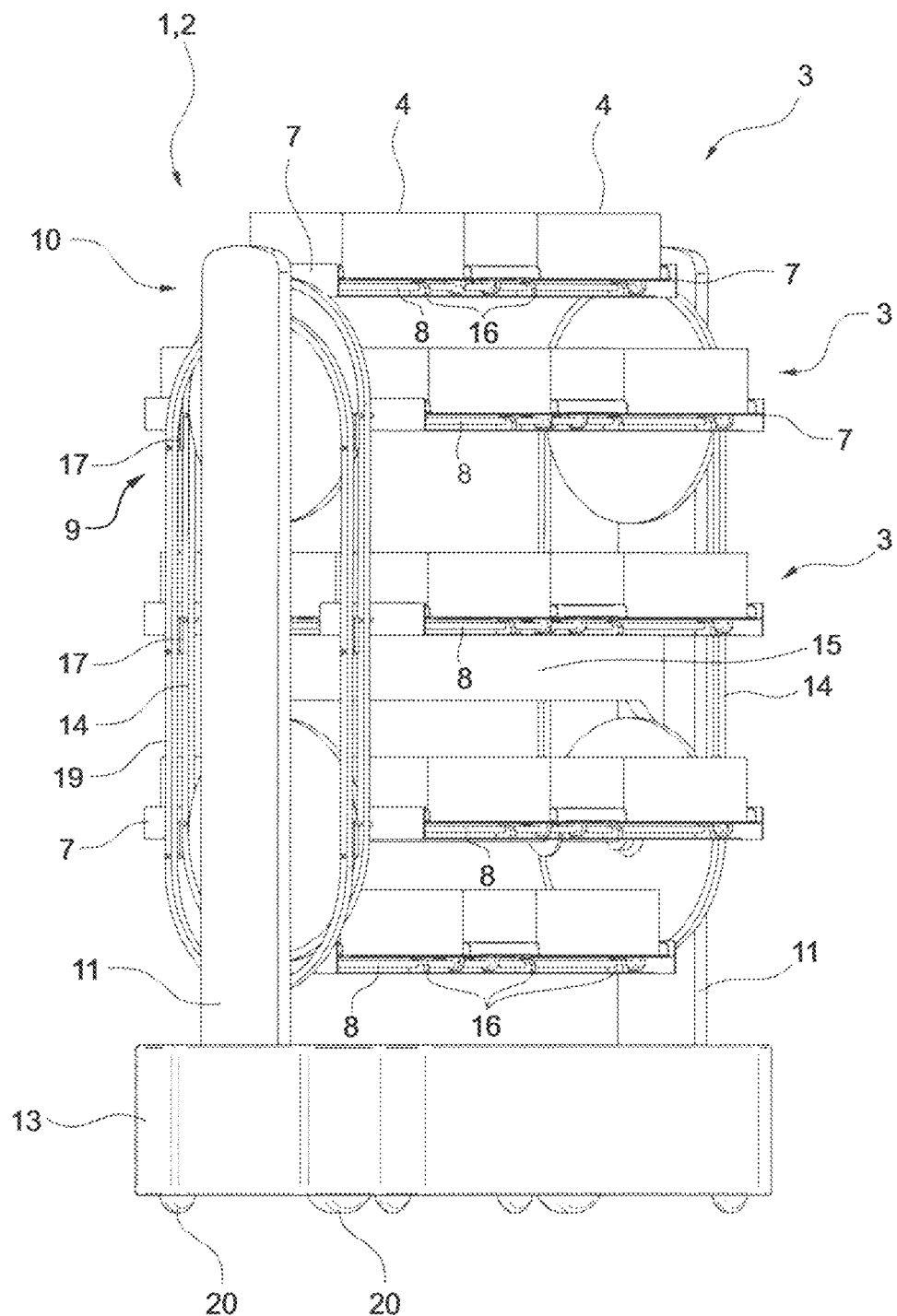
Figure 4:
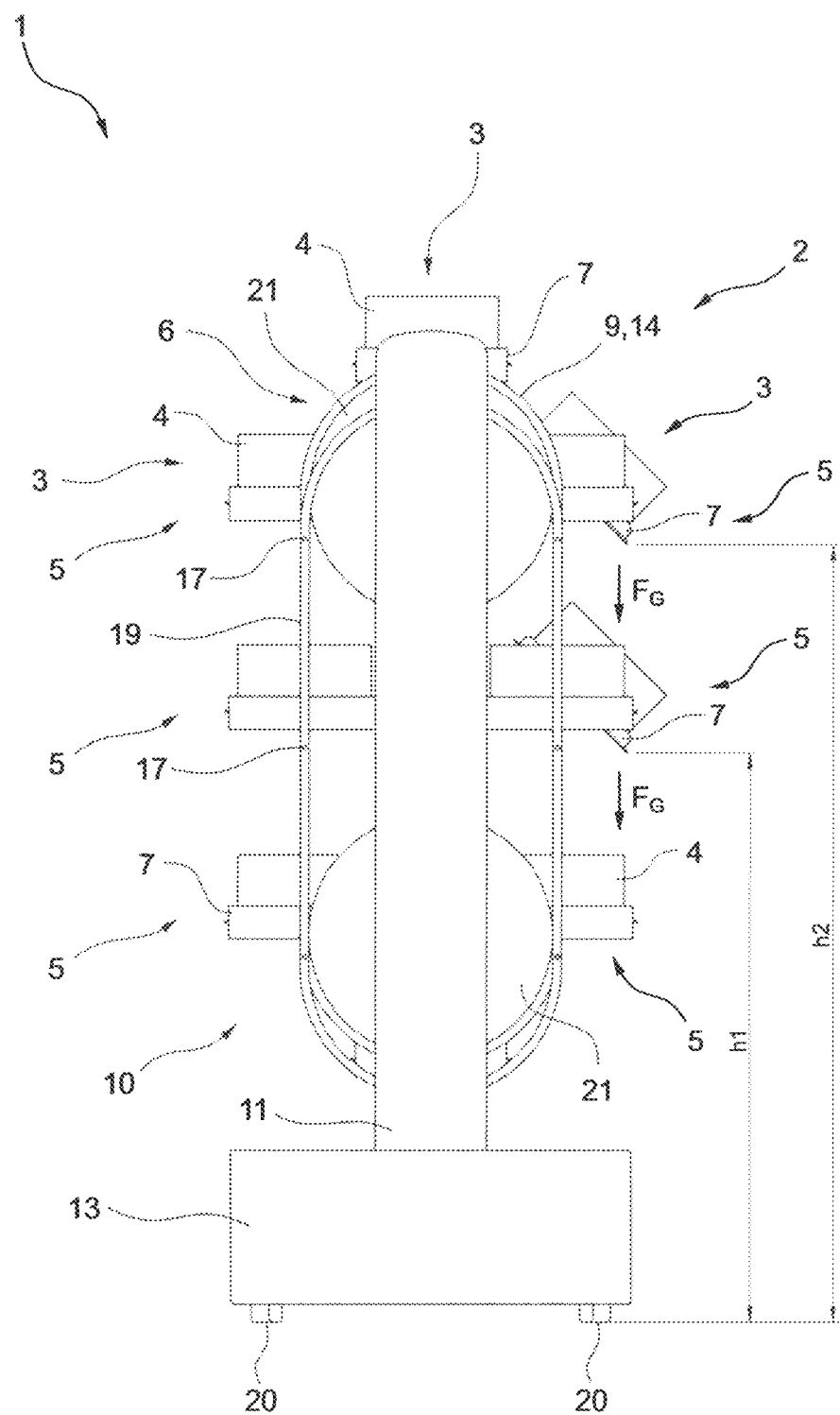
Figure 5:
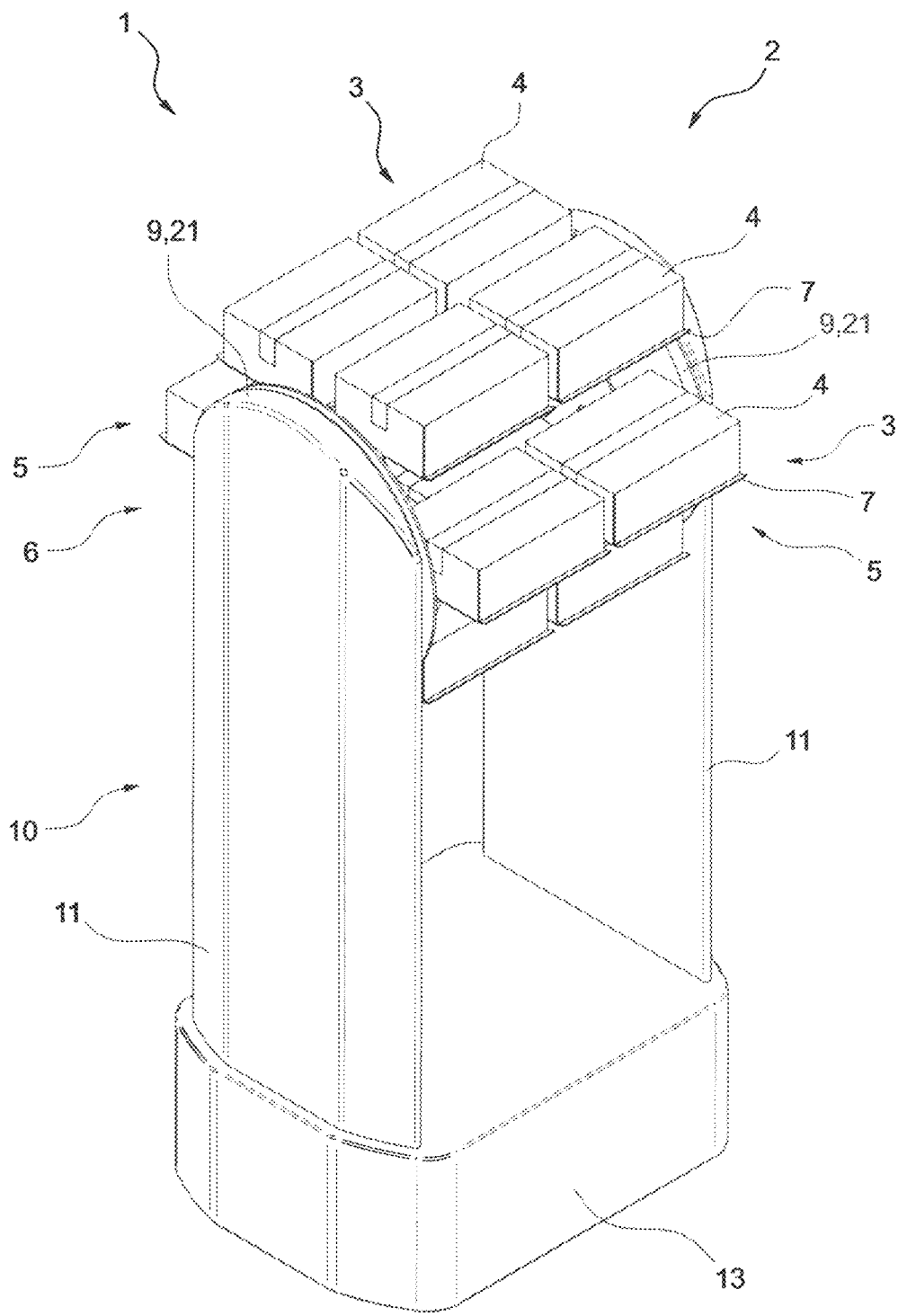
Figure 6:
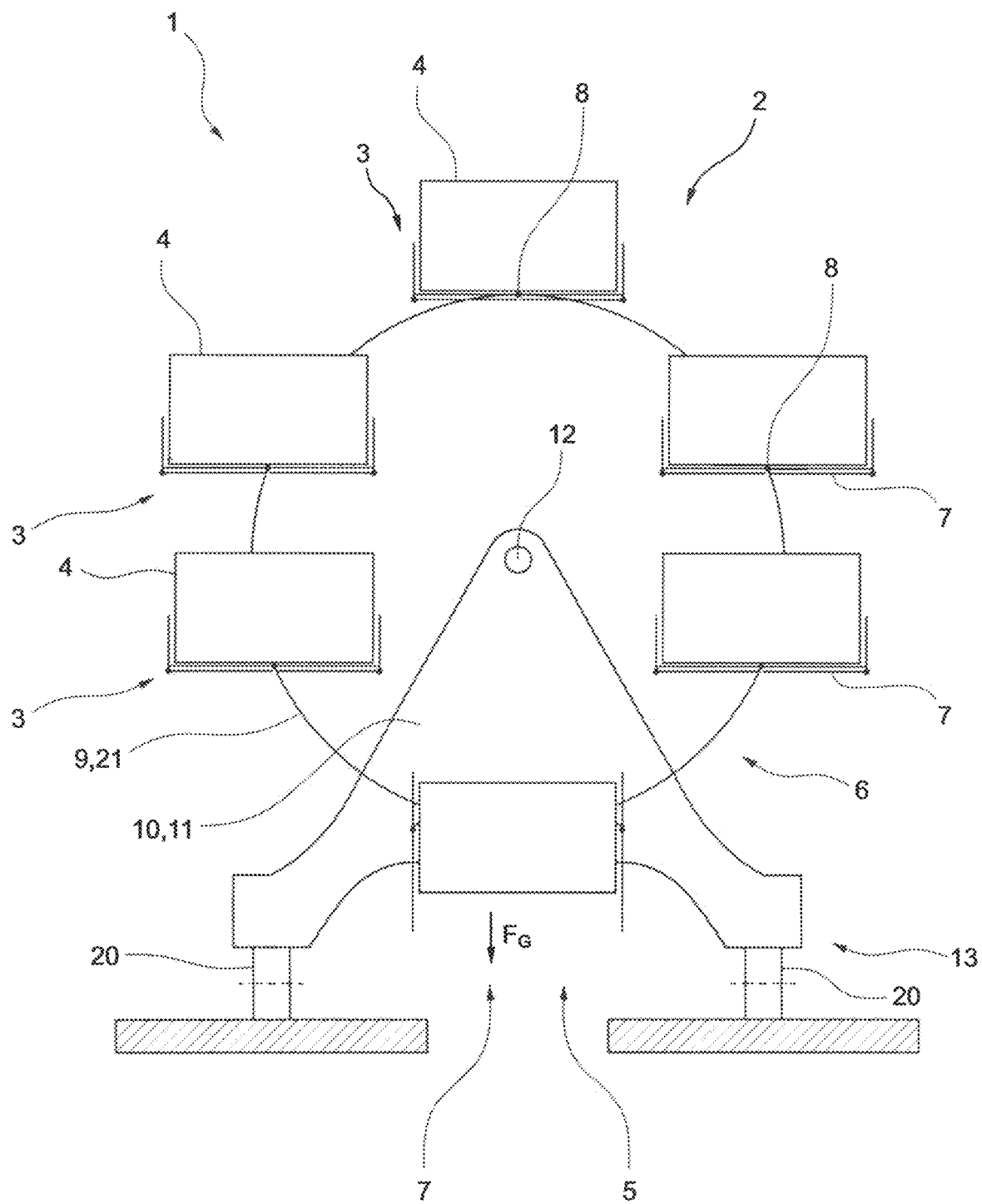
Figure 7:
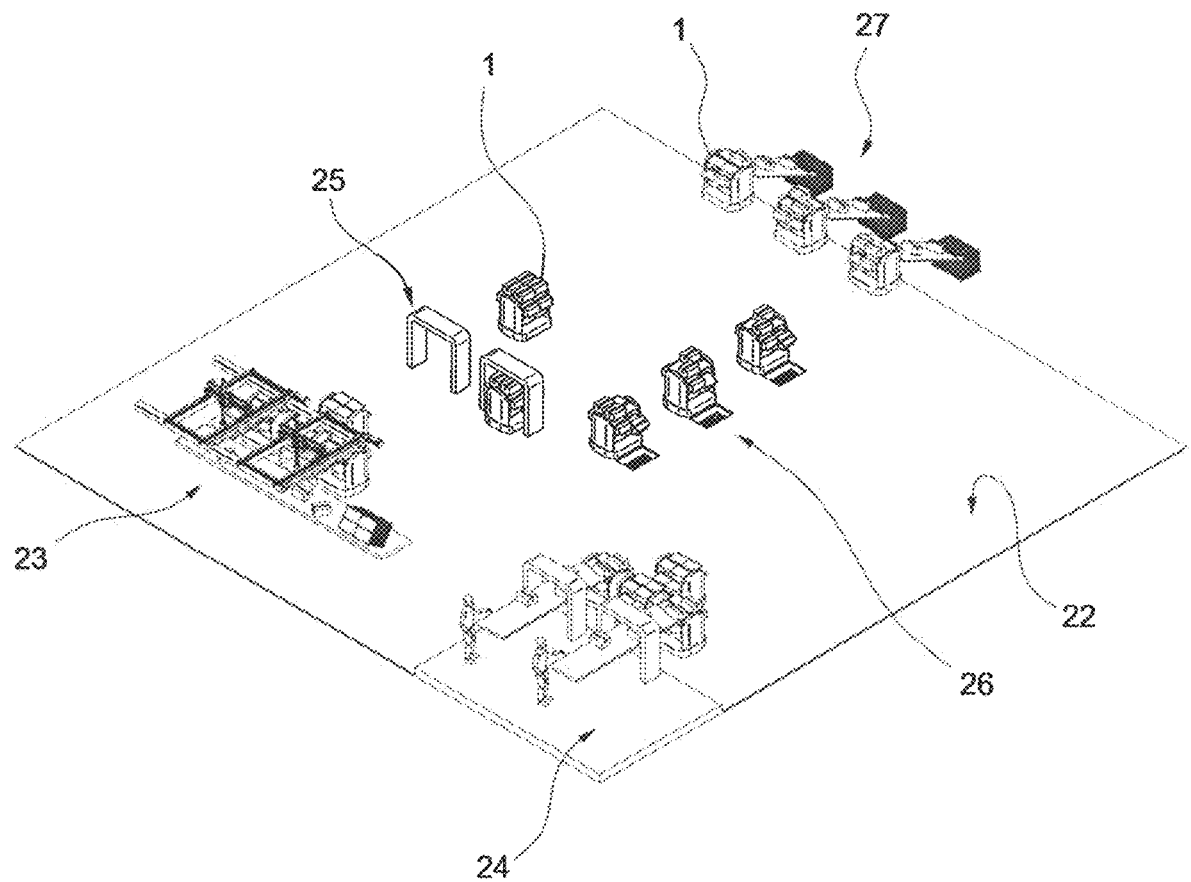
Figure 8:
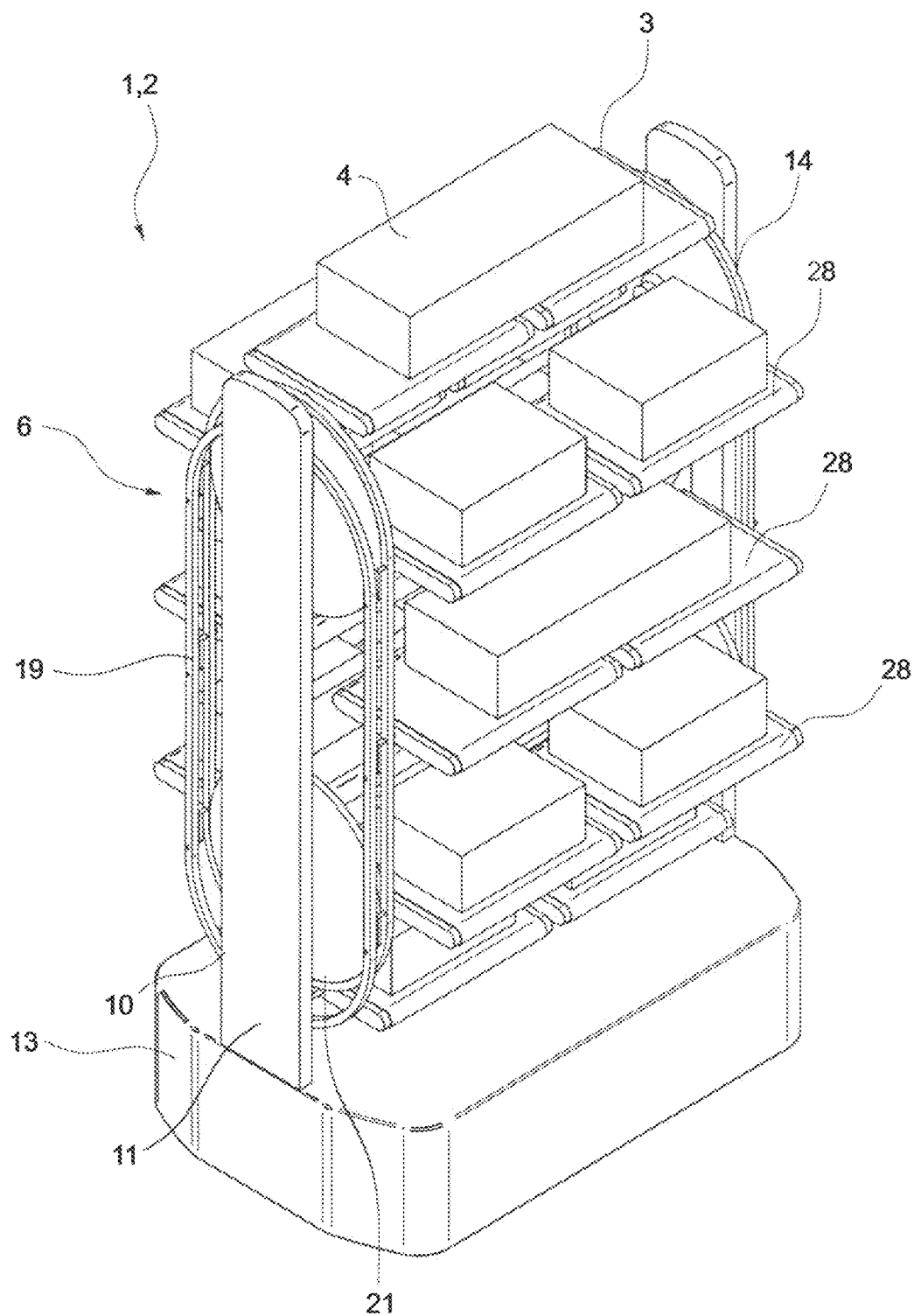

Further characteristics, advantages and features of the invention are indicated in the following description of preferred embodiments of the invention by means of the accompanying drawings which show:

FIG. 1 a perspective view of a first embodiment of the mobile sorting unit;

FIG. 2 a side view of a second embodiment of the mobile sorting unit;

FIG. 3 a perspective view of the second embodiment of the mobile sorting unit;

FIG. 4 a front view of the second embodiment of the mobile sorting unit;

FIG. 5 a perspective view of a third embodiment of the mobile sorting unit;

FIG. 6 a front view of a fourth embodiment of the mobile sorting unit;

FIG. 7 a perspective view of a parcel distribution center using mobile sorting units;

FIG. 8 a perspective view of a further embodiment of the mobile sorting unit.

DETAILED DESCRIPTION

Example embodiments will now be described more fully with reference to the accompanying drawings.

A first embodiment of the mobile sorting unit 1 is shown in FIG. 1. The platform of the unit is realized by an AGV 13 being able to autonomously move the mobile sorting unit 1 between a plurality of load, discharge and cargo item detection stations in a working area. A cargo receiving unit 2 is mounted on the mobile sorting unit 1, comprising a mounting frame 10 supported on the AGV 13, comprising two vertical struts 11 between which a rotary conveyor 6 is held. The rotary conveyor 6 has a horizontal rotation axis and a vertical rotation plane. It comprises two opposite rotary conveying means 9 realized as circular discs. A plurality of cargo carriers 3 is perpendicularly mounted between the discs, the cargo carriers 3 each comprising a shaft 8 rotatably mounted between the discs and two individually tiltable trays 7 side by side rotatably mounted on the shaft 8. The cargo carriers 3 can be rotated to any position of the cargo receiving unit 2. As is shown are two cargo items 4 placed on two of the trays. The trays 7 of the mobile sorting unit 1 are accessible or reachable to load cargo items 4 on it when the respective cargo carriers 3 are positioned at a top position or are positioned at a lateral position of the mobile sorting unit 1. As shown in the figure, the lateral positions can be used for discharging the cargo items. For unloading, the corresponding trays 7 are first moved into a lateral discharging position 5. Then, by titling the tray to be unloaded towards the outside of the mobile sorting unit 1, the cargo item on the tray 7 is unloaded by sliding or falling off the tray 7. The tray 7 can be tilted by about 45 degrees for side discharge of the cargo. Alternatively, the tray can be tilted by about 90 degrees to discharge the load essentially vertically downwards. It is either possible to tilt only one of the trays 7 in the discharging position 5 or to tilt both of the trays 7. When the trays 7 are rotated by the rotary conveyor 6, their surface always remains facing upwards. In the uppermost position of the rotary conveyor 6, the trays 7 of two adjacent cargo carriers 3 form a flat surface in the embodiment shown. This makes it possible to load trays 7 of the side of the mobile sorting unit 1 facing a loading device as well as the side of the mobile sorting unit 1 facing away from the loading device in the same rotary conveyor 1 position.

FIGS. 2, 3 and 4 show another embodiment of the invention. The main difference is that the mobile sorting unit 1 of the embodiment shown has several lateral discharging positions 5 on each side of the mobile sorting unit 1 due to a greater construction height of the cargo receiving unit 2 and that the rotary conveyor 6 is realized by two opposite belt conveyors. The opposite conveyors 6 each have two deflection discs or pulleys 21 over which the respective belt 14 is guided. The two opposite pulleys 21 each are mounted on common shafts 12, 18 in the mounting frame 10, with one of the shafts 12 serving as drive shaft. The cargo carriers 3 each have shafts 8, by means of which the cargo carriers 3 are supported between the opposite rotary conveyors 6. The opposite ends of the shafts 8 are rotatably mounted in the opposite belts 14. The mounting frame 10 has two vertical supports 11, which are supported by a horizontal cross strut 15. The number of horizontal struts 15 is adaptable, alternatively other structures such as knee bracings etc. are possible. The driverless transport vehicle respectively the AGV 13 has wheels 20 by which it moves. To hold the trays 3 in an upright position, so that the surface of the trays 7 always faces upwards, except for the tilting operations for discharging, a holding belt 19 is arranged parallel to and at the outside of one of the rotary conveyors 6 and slightly offset vertically below or alternatively above to it. The holding belt is 19 connected to the adjacent belt 14 in such a way that approximately Z-shaped coupling rods 17 connected to the shafts 8 are each rotatably anchored in the holding belt 19. As the rotary conveyor 6 rotates, the vertical offset to the holding belt 19 remains constant, so that the coupling rods 17 always remain in the same vertical orientation and thus keep the shafts 8 of the cargo carriers 3 in the same orientation. The trays 7 rotatably mounted on the shafts 8 can each be activated via solenoid switches or individual motors so that individual tilting processes can be initiated. The trays 7 can for example be mounted on the shafts 8 via tilt bushings 16.

FIG. 4 shows the mobile sorting unit 1 during a discharging process. It can be seen that the discharging process takes place simultaneously on two levels of the cargo receiving unit 2, as shown on a first height h1 and a second height h2 thereby representing two different discharging positions 5. It is conceivable that the different cargo carriers 3 are approached to two vertically offset cargo pick-up units, so that the cargo can be fed simultaneously to different target destinations. In the embodiment shown, unloading is thus possible at up to 6 unloading positions simultaneously. As can be seen, the discharging of the cargo items 4 is achieved simply by tilting the trays 7 so that the cargo items simply fall out of the mobile sorting unit 1 due to their gravitational force $F_G$.

The embodiment shown in FIG. 5 is essentially the same as the embodiment shown in FIG. 1, with the difference that in the embodiment shown the vertical struts 11 are higher so that the cargo receiving unit 2 can operate at a higher level. The height of the vertical struts 11 is simple and can be adjusted to suit individual applications.

A further embodiment is shown in FIG. 6. This is also based on the embodiment shown in FIG. 1. The main difference lies in the design of the trays 7, which have a different unloading mechanism. At the same time, the discharging position 5 in the shown embodiment is not at the top or side of the rotary conveyor 6, but at its bottom. The unloading mechanism provides that the cargo items 4 fall out of the tray 7 towards the bottom of the tray 7. For this purpose, the tray 7 has two centrally opening flaps which are hinged to the side of the load carrier 3 and fold away downwards so that the cargo unit 4 can fall out downwards. For this purpose, the mobile sorting unit 1 or the AGV 13 has an open base so that the load can fall into a receiving device underneath the AGV 13, for example. The advantage of this embodiment is the low height at which the cargo items 4 fall, so that even sensitive loads can be transported.

FIG. 7 shows an example of a possible application site for the mobile sorting unit 1 according to the invention. In a logistics or production area 22, several mobile sorting units 1 are used for transport between different stations 23, 24, 25, 26, 27. This means that no permanently installed conveyor systems are necessary. Station 23 is an automatic loading device, where the cargo items 4 to be transported arrive and which arranges these cargo items in such a way that they are sent to different belt conveyors, where the mobile sorting units 1 can be parked in such a way that the packages 4 conveyed by the belt conveyors can be loaded onto the currently uppermost cargo carriers 3. The rotary conveyor 6 of the respective mobile sorting unit 1 can continue to rotate the positions of the cargo carriers 3 until all trays 7 of the mobile sorting unit 1 are filled. Station 24 is a manual loading station, which has essentially the same function as the previously mentioned station 23, but the packages 4 are manually placed by workers on the respective belt conveyors. After loading the mobile sorting units 1, they pass through a cargo item identification station 25, where the barcodes or the like on the individual cargo items are scanned and the respective allocation of the individual cargo items 4 to the respective trays 7 on which the cargo items 4 are placed is determined. After receiving this information, a control unit of the mobile sorting unit 1 is operated such that the mobile sorting unit 1 follows an optimized route for the fastest possible delivery of all cargo items 4 and unloads the cargo items to be delivered at each approached station.

The mobile sorting units 1 then drive to one or more stations 26, 27 to deliver the individual cargo items 4 and then return to loading stations 23 or 24. Station 26, for example, is an unloading station with a receiving opening in the floor. Accordingly, a lateral or bottom discharging position 5 of the mobile sorting unit 1 is used for this opening. Station 27, on the other hand, has inclined chutes, over which the unloaded cargo items slide into assigned receptacles. At these stations, therefore, unloading of the cargo items 4 via a lateral discharging position or via the top position of the rotary conveyor 6 is possible.

FIG. 8 shows another embodiment of the mobile sorting unit 1 which comprises instead of tiltable trays 7 or at least in addition to it crossbelts 28 on each cargo carrier 3. The crossbelts 28 are configured to discharge cargo items 4 without tilting the carrier out of its horizontal plane. The crossbelts 28 are arranged such that they can discharge items parallel to the rotation plane of the rotary conveyor 6. This is especially helpful for unloading onto horizontally running conveyor belts. The advantage of this embodiment is that unloading can take place at the same height as the delivery surface, which means that the space required is comparatively small. As can be seen the cargo carriers 3 are configured to each carry one item 3 or alternatively carry one item 3 together with a neighboring cargo carrier 3. For this case, the crossbelts 28 of the neighboring cargo carriers can be controlled such that they simultaneously perform the same movement.

The features disclosed in the foregoing description, in the claims and the accompanying drawings may, both separately or in any combination, be material for realizing the invention in diverse forms thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile sorting unit for transporting cargo comprising:
   a cargo receiving unit, the cargo receiving unit having a plurality of cargo carriers for receiving a plurality of cargo items;
   the cargo receiving unit being configured for autonomous discharging of the cargo items in any desired order by moving the cargo carriers to be unloaded to a discharge position;
   wherein the cargo carriers are moved to the discharge position by a rotary conveyor;
   a platform realized by an automated guided vehicle (AGV) being able to autonomously move the mobile sorting unit between a plurality of load and discharge stations in a working area; and
   a controller configured to autonomously move the sorting unit to different locations,
   wherein the controller is configured for operating the mobile sorting unit such that it follows an optimized route for the fastest possible delivery of all cargo items.

2. The mobile sorting unit according to claim 1, wherein the cargo receiving unit is configured to discharge the cargo items by gravitational force ($F_G$).

3. The mobile sorting unit according to claim 1, wherein the cargo carriers each comprise means for unloading cargo items on their own in a horizontal unloading direction.

4. The mobile sorting unit according to claim 1, the cargo receiving unit being configured for receiving the cargo items by moving the cargo carriers to be loaded to a receiving position.

5. The mobile sorting unit according to claim 1, wherein the rotary conveyor has a vertical rotation plane.

6. The mobile sorting unit according to claim 1, wherein each cargo carrier is configured to receive one cargo item.

7. The mobile sorting unit according to claim 1, wherein the cargo carriers are tiltable trays, the trays being tiltable between a loading and/or carrying state and a discharging state.

8. The mobile sorting unit according to claim 7, the trays being horizontal in the loading and/or carrying state, and the trays being tilted out of the horizontal plane in their discharging state.

9. The mobile sorting unit according to claim 7, wherein each tray is individually tiltable.

10. The mobile sorting unit according to claim 7, wherein the tiltable trays are each fixed in the rotary conveyor via a shaft arranged transverse to the conveying direction, the trays being tiltable relative to the shaft, wherein at least one tray is mounted on each shaft.

11. The mobile sorting unit according to claim 10, wherein the rotary conveyor comprises two parallel rotary conveying means spaced apart from each other, between which the shafts are mounted.

12. The mobile sorting unit according to claim 10, wherein a plurality of shafts is mounted spaced apart from each other in essentially equal distances over the circumference of the rotary conveyor.

13. The mobile sorting unit according to claim 5, wherein the rotary conveyor is held by a mounting frame which is mounted on or suspended from the mobile sorting unit, wherein the mounting frame comprises at least two vertical struts between which the rotary conveyor is being held.

14. The mobile sorting unit according to claim 5, wherein the rotary conveyor is driven by at least one drive shaft mounted in the mounting frame.

15. A method for delivering cargo items to at least two different stations in a logistics area, a production area or the like with a mobile sorting unit, comprising:
   Loading a plurality of cargo carriers of the mobile sorting unit according to claim 1 with a plurality of cargo items in a random or defined order from a horizontal loading direction;
   Respectively moving the cargo carriers to be unloaded to a discharging position on the mobile sorting unit in order to realize a shortest, delivery route of the mobile sorting unit in the logistics area, the production area or the like;
   Approaching at least two different cargo item delivery stations with the mobile sorting unit for unloading cargo items assigned to the respective stations.

16. The method according to claim 15, wherein unloading of the cargo items is realized by gravitational force.

17. System comprising a mobile sorting unit for transporting cargo comprising:
   a platform realized by an automated guided vehicle (AGV) being able to autonomously move the mobile sorting unit between a plurality of load and discharge stations in a working area;
   a cargo receiving unit, the cargo receiving unit having a plurality of cargo carriers for receiving a plurality of cargo items, wherein each cargo item is provided with a detectable identifier;
   the cargo receiving unit being configured for autonomous discharging of the cargo items in any desired order by moving the cargo carriers to be unloaded to a discharge position;
   wherein the cargo carriers are moved to the discharge position by a rotary conveyor; and
   a controller configured to autonomously move the sorting unit to different locations;
   the system further comprising an identification device configured to identify the loaded cargo items and their position on the mobile sorting unit;
   wherein the controller is further configured to:
   receive the information concerning the identified cargo items and their position on the mobile sorting unit;
   receive information about the delivery locations of each cargo item from a higher-level cargo item management system; and
   plan an optimized route for the fastest possible delivery of all cargo items based on the received information.

* * * * *